United States Patent [19]

Boddu et al.

[11] Patent Number: 4,975,878

[45] Date of Patent: Dec. 4, 1990

[54] PROGRAMMABLE MEMORY DATA PROTECTION SCHEME

[75] Inventors: Sudhakar Boddu, Sunnyvale; Vikram Kowshik; Elroy M. Lucero, both of San Jose, all of Calif.

[73] Assignee: National Semiconductor, Santa Clara, Calif.

[21] Appl. No.: 409,958

[22] Filed: Sep. 18, 1989

Related U.S. Application Data

[63] Continuation of Ser. No. 149,373, Jan. 28, 1988, abandoned.

[51] Int. Cl.$^5$ ............................................. G11C 16/06
[52] U.S. Cl. ............................... 365/189.07; 365/195; 365/228
[58] Field of Search ........... 365/195, 228, 185, 189.07, 365/230.08; 364/200 MS File, 900 MS File

[56] References Cited

U.S. PATENT DOCUMENTS

| | | | |
|---|---|---|---|
| 3,108,257 | 10/1963 | Bucholz | 365/195 |
| 3,264,615 | 8/1966 | Case et al. | 364/200 |
| 3,328,768 | 4/1964 | Amdahl et al. | 364/200 |
| 3,340,539 | 9/1967 | Sims, Jr. | 364/200 |
| 3,573,855 | 4/1971 | Cragon et al. | 364/200 |
| 3,742,458 | 6/1973 | Inoue et al. | 365/200 |
| 3,803,559 | 4/1974 | Bandoo et al. | 364/200 |
| 3,916,385 | 10/1975 | Parmar et al. | 364/200 |
| 4,177,510 | 12/1979 | Appell et al. | 364/200 |
| 4,298,934 | 11/1981 | Fischer | 364/200 |
| 4,382,279 | 5/1983 | Ugon | 364/200 |
| 4,430,709 | 2/1984 | Schleupen | 364/200 |
| 4,521,852 | 6/1985 | Guttag | 364/200 |
| 4,521,853 | 6/1985 | Guttag | 364/200 |
| 4,577,282 | 3/1986 | Caudel et al. | 364/200 |
| 4,584,665 | 4/1986 | Vrielink | 364/900 |
| 4,698,750 | 10/1987 | Wilkie et al. | 364/200 |
| 4,701,846 | 10/1987 | Ikeda et al. | 364/200 |
| 4,744,062 | 5/1988 | Nakamura et al. | 365/228 |

Primary Examiner—Glenn Gossage
Attorney, Agent, or Firm—Limbach, Limbach & Sutton

[57] ABSTRACT

An integrated, non-volatile memory protect register is provided for the memory array of a monolithic integrated circuit device. The memory array includes a plurality of programmable data storage registers, each having an associated address. The storage register addresses define the storage registers sequentially from an initial register in the array to a final register in the array. The memory protect register stores the address of a preselected storage register in the array. All registers in the array having addresses equal to or greater than the address of the preselected register are protected from any write operation. This address can be "locked" into the memory protect register to provide permanent data security to all protected registers.

2 Claims, 6 Drawing Sheets

PROGRAMMABLE MEMORY DATA PROTECTION SCHEME

This is a continuation of copending application Ser. No. 149,373 filed on Jan. 28, 1988, now abandoned.

BACKGROUND OF THE INVENTION

1. Field of the Invention

The present invention relates to integrated circuit memory devices and, in particular, to an integrated, non-volatile, reconfigurable data protection scheme for an electrically erasable programmable read only memory (EEPROM) device.

2. Discussion of the Prior Art

Conventional electronic data processing systems utilize storage devices, i.e., memory, for holding items of information which are to be used in or manipulated by the system. A memory comprises an array of locations for storing information items, generally referred to as "words", in the form of a plurality of digital bits, i.e. 1s or 0s. Each storage location in the array has an associated address which defines its position in the memory array. Access to that location for the purpose of writing in or reading out an information word is gained by specifying the proper address together with an instruction that identifies the operation to be performed at the specified address.

To ensure the protection of stored information, it is common to designate certain areas of the memory array or groups of storage locations within the array as having "protected" status and to provide means for limiting access to these protected areas or locations.

Protection schemes are available for external bulk memory, such electrostatic system memory or magnetic core memory, of the type usually associated with data processing systems.

For example, U.S. Pat. No. 3,264,615 issued to R. P. Case et al. on Aug. 2, 1966, discloses a data processing system having an addressable bulk memory, a register for holding a memory address field which consists of a plurality of address bits that are common to a group of addresses, and comparison circuitry for comparing the address field held in the register with memory addresses sought to be accessed. The comparison determines whether the address sought to be accessed contains the pattern specified by the field. Control circuitry signals a violation of a protected area in response to a predetermined result of the comparison. The control circuit can cause either an equal or an unequal comparison result to signal a violation. Thus, the address field may specify either a protected area or an unprotected area separating non-contiguous protected areas. Variation in the size of the protected area is accomplished by varying the number of address bits in the field which must be compared. A count register holding a value identifying the number of bits to be compared controls this process. The field register, count register and the circuitry for determining which comparison result will signal violation of a protected area are all subject to program control so that their contents and status may be altered at will.

U.S Pat. No. 3,573,855 issued to H. G. Cragon on Apr. 6, 1971, discloses a data processing system which is provided with a central processing unit that includes an arithmetic unit which is accessible to and from a thin film memory over buffer channels. The system is provided with registers for storing upper and lower memory limits for data to be read, data to be written and instructions to be fetched for execution. Comparison circuitry responds to a request from memory for comparing each memory request with the limits stored in the register file. The request for memory access is enabled only if the comparison indicates that the access is within the specified limits.

U.S. Pat. No. 3,742,458 issued to Inoue et al. on June 26, 1973, discloses an apparatus for flexible protection against overwriting and destruction of the contents of selected portions of memory. Each memory unit is assigned a unique memory address number which serves to identify the memory unit and instructions to write data into the memory. The addresses are segregated into ranges of numbers defining separate memory portions to be protected, with the numbers at the boundaries of the ranges being entered into registers which can be reset to flexibly determine the protected ranges. Thus, the memory device is separated into three different portions: one permitting free writing access to the memory units, one withholding all writing access to the memory units, and one being conditioned to grant or withhold writing access according to the setting of a device, such as a flip-flop, which can be arranged for manual or programmable control. Whenever an instruction to alter a memory unit arises, the associated address number is entered into a register and compared by means of digital comparators with the range boundary numbers in their registers. A gate then grants or withholds access to the memory unit in accordance with the comparison, thereby controlling the insertion of data into each memory unit and providing protection to selected portions of the memory device.

In the case of monolithic integrated circuit memory devices, Read-Only-Memories (ROMs) are considered to be fully data-protected because ROM programming is performed one time only during fabrication. That is, once programmed, there is no way that the user can alter the contents of the ROM. Ultraviolet Erasable Programmable ROMs (UVEPROMs) provide the user with the flexibility to change the contents of the memory. To alter the contents of a UVEPROM, however, it is first necessary to erase the entire memory using UV light and then reprogram it with the desired data pattern. Another type of ROM is the so-called Electrically Erasable ROM (EEPROM). This memory type provides in-system programming and, like other ROMs, is also nonvolatile.

As in the case of the bulk memory examples discussed above, the need for memory protection for monolithic memory devices arises when the user, after deciding on the final data pattern, wants to permanently store the contents in the memory. Both UVEPROMs and EEPROMs are vulnerable to intentional or accidental data modifications. Therefore, it would be highly desirable to have available some means for providing data security for these types of devices.

SUMMARY OF THE INVENTION

A memory protection scheme is provided whereby the number of protected registers within the memory array is user-controlled and the range of protected registers can be varied from the last register only to all registers being fully protected against data modifications.

N registers, where N is less than or equal to the total number of registers in the array, can be protected against data modification by programming the address of the first register to be protected into a special, integrated memory protect register. All memory registers having addresses equal to or greater than the address specified in the memory protect register are then protected from any write operation. This address can be "locked" into the memory protect register to provide permanent data security to all protected registers. That is, a portion of the memory array can be converted to ROM. The memory protect register is a nonvolatile register comprising electrically erasable elements.

Other objects, advantages and features of the present invention will be understood and appreciated upon review of the detailed description of the invention provided below, which should be considered in conjunction with the accompanying drawings.

DETAILED DESCRIPTION OF THE INVENTION

Figure 1:
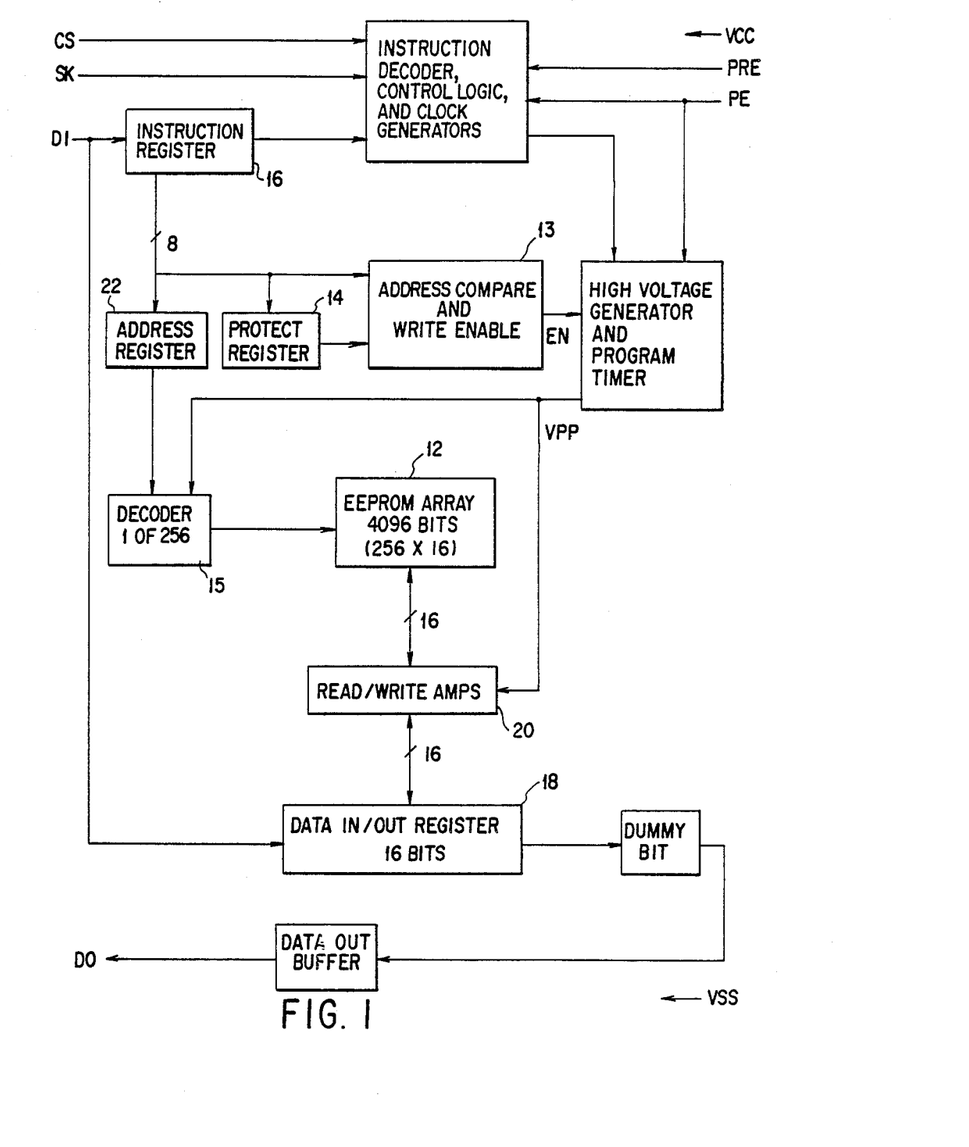
FIG. 1 is a block diagram illustrating the basic elements of a 4K-bit EEPROM array which utilizes a memory data protection scheme in accordance with the present invention.

FIG. 1 shows the basic elements of an electrically erasable programmable read only memory (EEPROM) device 10. The device 10 includes an EEPROM array 12 which is divided into 256 data storage registers of 16 bits each. Each of the storage registers in the array 12 has an address associated with it; the addresses define the storage registers sequentially from an initial register (i.e. $R_1$) to a final register (i.e. $R_{256}$). As described in greater detail below, in accordance with the present invention, N registers ($N \leq 256$) in the array 12 can be protected against data modification by programming into a special on-chip, memory protect register 14 the address of the first register in the memory array 12 to be protected. Thereafter, all attempts to alter data in a storage register within the array 12 whose address is equal to or greater than the address stored in the memory protect register 14 will be ignored.

As further shown in FIG. 1, data is written into the memory array 12 by serially clocking a WRITE instruction into an instruction register 16 and then clocking 16 bits of data to be written into the address specified in the WRITE instruction into a data shift register 18. After the 16 bits of data have been clocked into data shift register 18, this data is transferred in parallel to the specified storage register in array 12 via sense amplifiers 20 in a single, self-timed, 7.5 ms WRITE cycle.

A READ instruction loads the address of the first memory register to be read from the instruction register 16 into an 8-bit address register 22. The data from the accessed storage register within the array 12 is then transferred in parallel to the data shift register 18 and then clocked out serially to the Data-Out pin DO. A particular technique for reading data from array 12 is described in greater detail in copending and commonly assigned U.S. Pat. Application Ser. No. 149,399, now U.S. Pat. No. 4,873,671, titled SEQUENTIAL READ ACCESS OF SERIAL MEMORIES WITH A USER-DEFINED STARTING ADDRESS, filed on even date herewith by Kowshik et al, which application is hereby incorporated by reference.

As stated above, N registers ($N \leq 256$) within the array 12 can be protected against data modification by programming the protect register 14. This register stores the address of the first register in the array 12 to be protected. All registers whose addresses are equal to or greater than the address specified in the protect register 12 will be protected from any WRITE operation. This address can also be "locked" into the protect register to provide permanent data security to all the protected registers, that is, converting a portion of the EEPROM array 12 into ROM.

Figure 2:
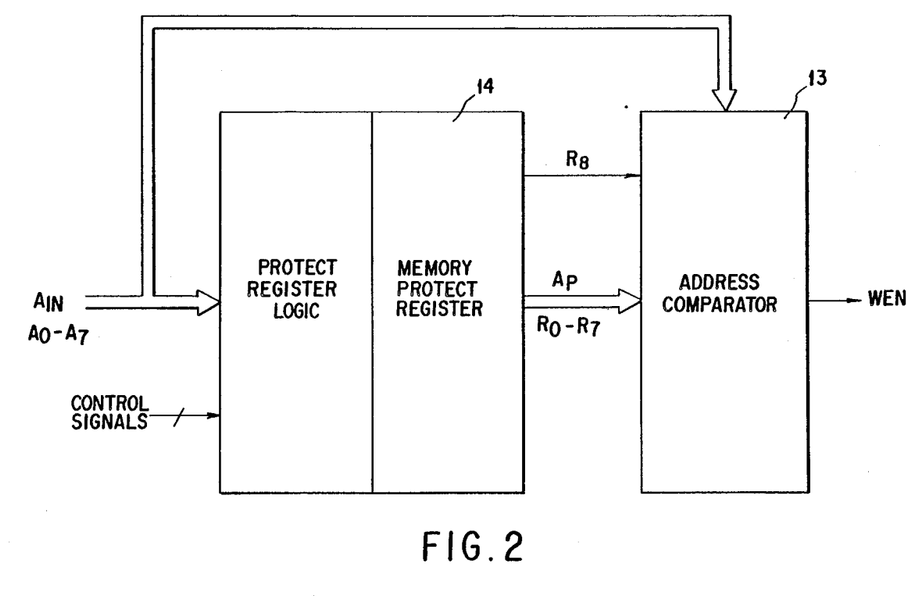
FIG. 2 is a block diagram illustrating a memory data protection scheme in accordance with the present invention.

FIG. 2 provides a simple block diagram of the memory protection scheme of the present invention. "Ap" is the address stored in the memory protect register 14. As described in greater detail below, the protect register 14 is a non-volatile register comprising electrically-erasable elements. An address comparator 13 compares the address stored in the protect register 14 with the present input address Ain. A Write Enable signal WEN for array 12 goes high enabling the appropriate address decoder 15 (see FIG. 1) if and only if Ap>Ain. It should be noted that the entire array 12 can be unprotected by executing a "Protect Register Clear (PRCLR)" instruction (R8=1). In this case, the array 12 behaves like an ordinary EEPROM and any register within the array 12 may be programmed.

To protect the entire array 12, the protect register 14 is programmed with the address of the first register in the array 12, which converts the entire array 12 into a ROM. To protect only a portion of the array 12, the protect register 14 is programmed with an address greater than the first address. Thereafter, only those registers whose addresses are equal to or greater than that stored in the protect register 14 will be protected against data changes.

To permanently disable the programming feature of the protected field of registers, the protect register address can be "locked" into the protect register 14 by executing a special instruction called "Protect Register Disable" (PRDS). Once this instruction "locks-in" the address stored in the protect register 14, there is no way the user can vary the range of protected addresses.

Figure 3:
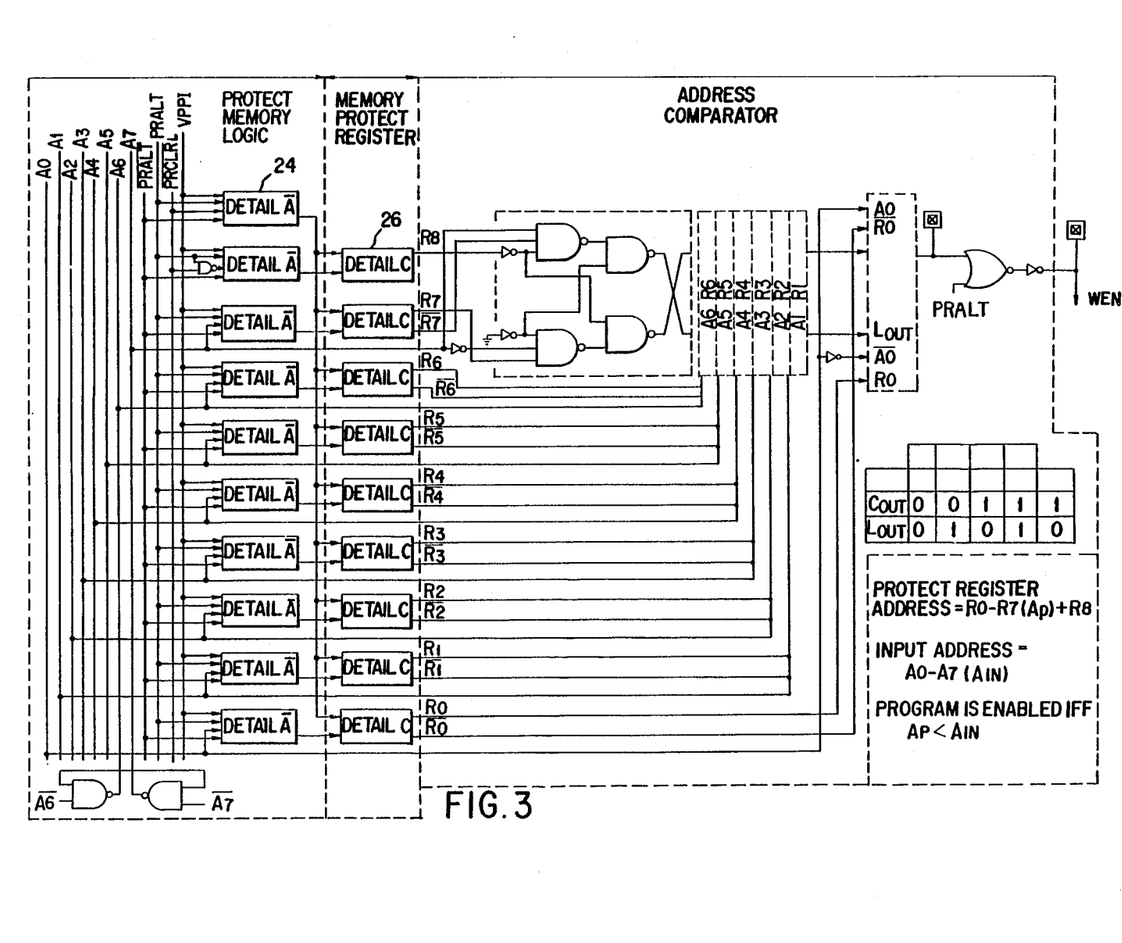
FIG. 3 is a circuit diagram illustrating an embodiment of memory data protection circuitry in accordance with the present invention.
Figure 4:
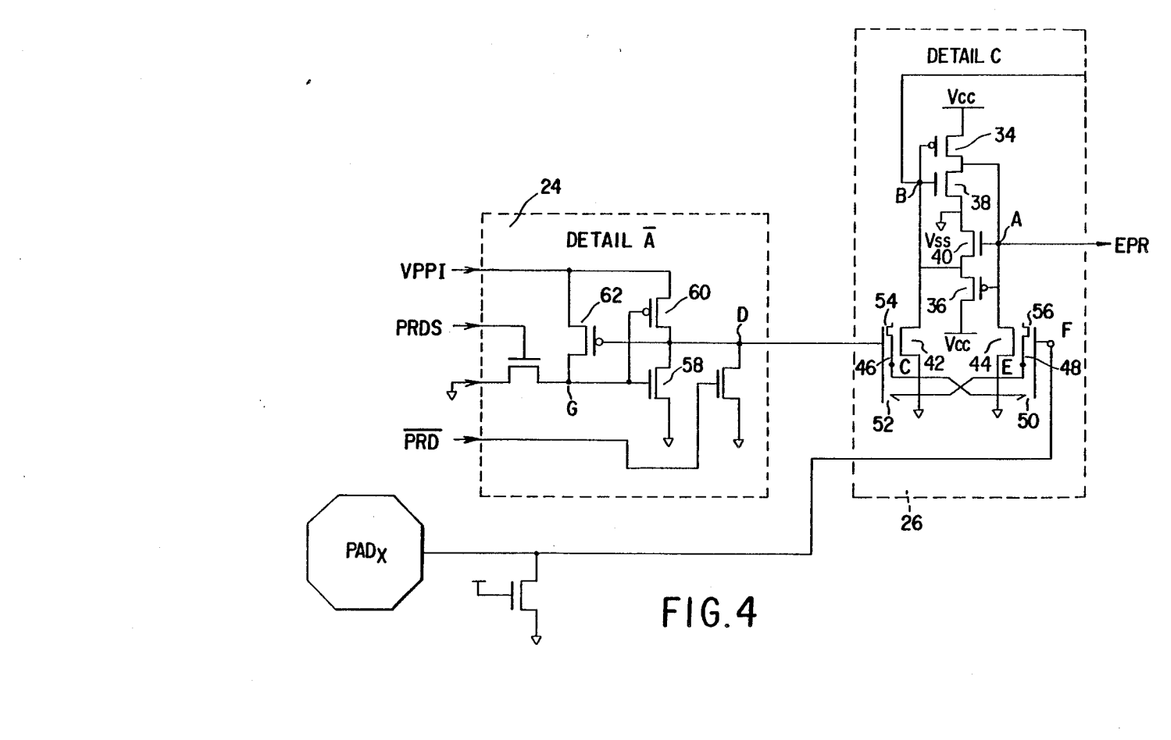
FIG. 4 is a circuit diagram illustrating in detail an embodiment of the protect register logic and memory protect register circuit blocks 24 and 26, respectively, shown in FIG. 3.

FIG. 3 shows a schematic diagram of one embodiment of memory protection circuitry in accordance with the present invention. FIG. 4 shows a circuit diagram of the "lock-in" circuit using the PRDS instruction. Also included in FIG. 4 are the detail circuits for DET-A and DET-C blocks 24 and 26, respectively, which are shown in FIG. 3. The address comparator shown in FIG. 3 compares the input address $A_0$–$A_7$ to the protect register address $R_0$–$R_7$ and its output WEN is high when An is less than $R_n$. "PADX" in FIG. 4 is the internal test pad which is not bonded out and "EPR" stands for "Enable Protect Register".

The basic memory protect register latch circuit 26 comprises two subcircuits, as shown in FIG. 4. The first subcircuit is a cross-coupled static latch which includes two P-channel field effect transistors 34 and 36 and two N-channel field effect transistors 38 and 40. The second subcircuit includes two nonvolatile memory transistors 42 and 44.

The drains of transistors 34 and 38 ar coupled to each other at node A. The drains of transistors 36 and 40 are coupled to each other at node B. The sources of transistors 34 and 36 are connected to the positive supply potential VCC. The sources of transistors 38 and 40 are connected to the ground potential VSS. The gates of transistors 34 and 38 are coupled together and are also coupled to node B.

Figure 5A:
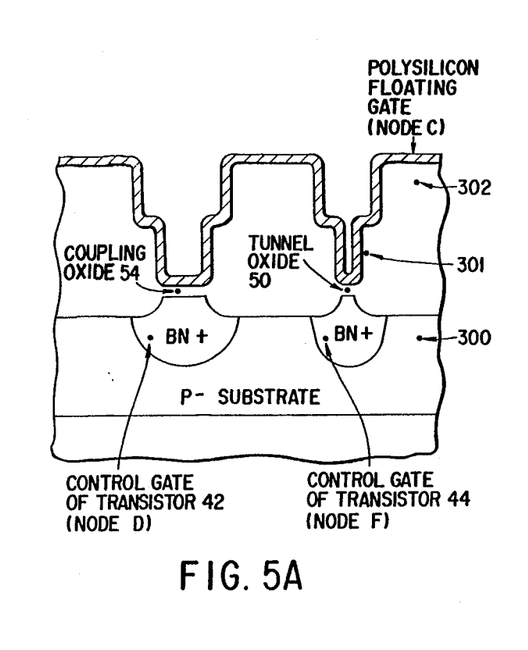
FIG. 5A is a cross-sectional view illustrating a portion of the nonvolatile memory cell utilized in the latch 26 as shown in FIG. 4.

Transistors 42 and 44 are N-channel floating gate MOSFET devices in which the floating gates are formed in a polysilicon layer and the control gates are selectively defined in the bulk silicon by a buried N+ implant mask. As shown in FIG. 4, the floating gate (node C) of the memory transistor 42 is capacitively coupled to its control gate (node D) via coupling capacitor 46. Coupling capacitor 46 is essentially formed by the overlap of the floating polysilicon gate and the buried N+ implant area exposed by the thin oxide mask, as illustrated in FIG. 5A. Likewise, the floating gate (node E) of the memory transistor 44 is capacitively coupled to its control gate (node F) via the coupling capacitor 48.

In addition to being capacitively coupled to their respective control gates, the floating gates of the transistors 42 and 44 are capacitively cross-coupled to the control gates of transistors 44 and 42, respectively, via relatively small area tunneling capacitor 52 and 50. The tunneling capacitors 50 and 52 are formed by the overlap of the floating gates of transistors 42 and 44 with the buried N+ implant areas which are exposed by the thin oxide mask and are electrically in common with the control gates of transistors 44 and 42, respectively. Both the coupling capacitors 46, 48 and the tunneling capacitors 50, 52 have relatively thin oxide (100 Angstroms) dielectrics between the floating gates and the control gates.

The drain of the memory element 42 is coupled to node B, which was defined above in conjunction with the cross-coupled static latch. Similarly, the drain of the memory element 44 is coupled to node A, which was also previously defined. The sources of both memory elements 42 and 44 are connected to the ground potential VSS.

In addition to the capacitive couplings indicated above, there are additional stray capacitances inherent in the layout of the latch shown in FIG. 2. These include the floating gate to control gate overlap capacitances in the nonthin-oxide areas and the capacitance due to the source and drain overlap to the floating gate in the memory transistors.

Figure 5B:
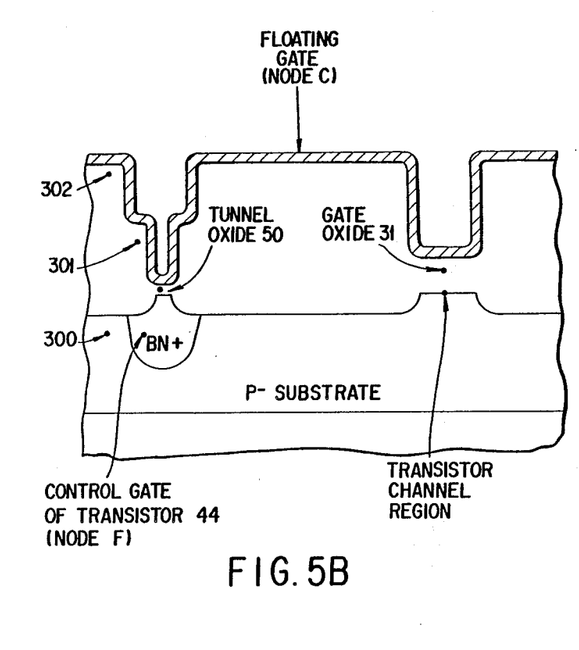
FIG. 5B is a cross-sectional view illustrating a second portion of the nonvolatile memory cell utilized in the latch 26 shown in FIG. 4.

FIGS. 5A and 5B show the cross-sectional views of the memory cell elements 42 and 44.

In FIG. 5A, region 300 comprises the P-type silicon in which the highly doped N+ source and drain regions are formed for the N-channel CMOS transistors. Also formed in the region 300 are buried-N+ diffusions which are not as highly doped compared to the source/drain N+ regions. The buried-N+ regions are used to form the control gates of the memory transistors and can also be used for conductive underpasses in other parts of the circuitry. The control gates of transistors 42 and 44 are shown in the cross-sectional diagrams of FIGS. 5A and 5B. The floating gates of transistors 42 and 44 are comprised of conductive polycrystalline silicon. The floating polycrystalline gate of transistor 42 is separated from the crystalline silicon by the coupling oxide 46, the tunneling oxide 50, the gate oxide 54, the oxide over the buried-N+ region 301, and the field oxide 302. The oxide 301 over the buried N+, region, is substantially thicker than the gate oxides. The field oxide, region, 302, is substantially thicker than the oxide in region 301.

In addition to the capacitive couplings "Ccoup" and "Ctun," due to the coupling and tunneling oxides respectively, the floating gate of transistor 42 is also capacitively coupled to its own control gate due to the overlap of the floating polysilicon gate to its control gate formed by the oxide over the buried-N+ region in the silicon substrate, "Cbn+g." Another component of the capacitance, "Cfld," is due to the overlap of the floating polysilicon gate to the substrate in the field oxide regions 302.

As shown in FIG. 4, in order to program latch 26, a high programming voltage "VPPI" (12-17v) must be applied to one of the two programming nodes D or F for about 5-10 ms. Considering the illustrated case in which VPPI is applied to node D, then the other programming node F must be held at the ground potential. For a virgin cell with no charge on the floating gate, an initial voltage equal to Rg·VPPI appears across the tunnel oxide 50, where;

$$Rg = \frac{Ccoup + Cbn + g}{Ccoup + Cbn + g + Ctun + Cfld + Cgox + Cbn + t} \quad (1)$$

where:
Rg : Control gate coupling ratio of the Memory element,
Ccoup: Floating gate to Control gate capacitance due to the coupling oxide,
Cbn+g: Floating gate to Control gate capacitance due to the buried N+ oxide around the gate region,
Ctun : Floating gate to Control gate of adjacent cell capacitance due to the tunnel oxide,
Cfld : Floating gate to substrate capacitance due to the field oxide,
Cgox : Floating gate to substrate capacitance due to the gate oxide,
Cbn+t: Floating gate to Control gate of adjacent cell capacitance due to the buried-N+ oxide around the tunnel oxide.

The initial electric field "E" across the tunnel oxide is given by:

$$E = \frac{Rg \cdot VPPI}{Ttun} \quad (2)$$

where,
Ttun: Thickness of tunnel oxide,
VPPI: Voltage applied to the Control gate of the memory cell.

If the initial electric field "E" is of the order of 9-10 Mv/cm, then a sufficient number of electrons tunnel through the tunnel oxide onto the floating gate of transistor 42 storing a net negative charge on node C so as to make an appreciable positive shift in the threshold voltage of this device. Also, the floating gate of transistor 44 is capacitively coupled up to an initial voltage equal to Rg·VPPI, where:

$$Rg = \frac{Ctun + Cbn + t}{Ccoup + Cbn + g + Ctun + Cfld + Cgox + Cbn + t} \quad (3)$$

The initial electric field across the tunnel oxide associated with the floating gate of transistor 44 is given by:

$$E = \frac{VPPI - Rg \cdot VPPI}{Ttun} \quad (4)$$

If the initial electric field "E" is of the order of 9–10 Mv/cm, then a sufficient number of electrons tunnel through the tunnel oxide out of the floating gate of transistor 44 storing a net positive charge on node E so as to make an appreciable negative shift in the threshold voltage of this device.

The operation of positive threshold voltage shift by the application of high voltage VPPI to the nonvolatile memory element is known as "ERASE" and the operation of negative threshold voltage shift is known as "WRITE" in EEPROM terminology.

Both the ERASE and WRITE operations are self-limiting. During ERASE, the initial electric field "E" sets up a Fowler-Nordheim conduction of electrons which follows the following relationship:

$$I\,init(\text{erase}) = a \cdot A \cdot E^2 \cdot \exp\frac{(-B)}{(E)} \quad (5)$$

The field "E" however decreases with time as more and more electrons tunnel through the tunnel oxide and are collected on the floating polycrystalline gate.

Eventually, the electric field "E" is so low that very few electrons tunnel through the oxide and further threshold voltage shift is negligible. Similarly, during the WRITE operation, the initial electric field "E'" sets up a Fowler Nordheim conduction which follows the relationship:

$$I\,init(\text{write}) = a1 \cdot A \cdot E'^2 \cdot \exp\frac{(-B1)}{(E')} \quad (6)$$

where: a, a1, B, B1 are physical constants which depend on the effective energy barrier heights at the injection interfaces and the effective mass ratio of electrons in the tunnel dielectric. A is the area of the tunnel dielectric.

During the WRITE operation, the electric field "E'" also decreases with time as more electrons tunnel through the tunnel oxide out of the floating gate and eventually leave the floating gate with a net positive charge. The electric field "E'" at this point is so low that very few electrons tunnel through the tunnel oxide and further threshold voltage shift is negligible.

During the READ mode, the control gates of both the memory elements 42 and 44 (nodes D and F) are held at the ground potential and the electric fields across the tunnel oxides are minimal and are only due to the charges on the floating gates due to the programming operation. The tunneling of charges at these low electric fields is negligible and this translates to long data retention times (on the order of 10 years or longer for Tj<or=150° C.). Thus, the two memory elements 42, 44 in the electrically alterable latch 26 remain programmed to their respective ERASED (enhancement) and WRITTEN (depletion) states. For the case when transistor 42 is ERASED and transistor 44 is WRITTEN (see FIG. 1), when the power is first turned on to the device, the following sequence of events occur:

(a) Node A is pulled low because transistor 44 is ON and is in the depletion mode;

(b) Node A going low forces the inverter formed by transistors 36 and 40 to try to force its output high. Transistor 42 being OFF (ERASED) allows node B to pull up towards VCC;

(c) The high going node B forces the output (i.e., node A) of the inverter formed by transistors 34 and 38 further towards the ground potential.

Eventually, due to the positive feedback, node B pulls up to VCC and node A is pulled down to VSS. At this point, the two cross-coupled inverters are latched to their proper states and no dc power is consumed by the circuit.

For the proper operation of the latch, the current sinking capability of the written memory element should be such that it can pull the corresponding cross-coupled latch node low enough to set the latch to its proper programmed state.

The latch circuit 26 described above can be used in conjunction with a high voltage inverter circuit 24, as shown in FIG. 4. The latch circuit 26 is described in copending and commonly assigned U.S. Pat. Application Ser. No. 149,568, now U.S. Pat. No. 4,858,185, titled ZERO POWER ELECTRICALLY ALTERABLE, NONVOLATILE LATCH, filed on even date herewith by Boddu et al.

The purpose of the protect register logic circuit 24 is to translate the low (VSS) and high (VCC) CMOS levels at its input into high (·VPPI 12–17v) and low (VSS) levels respectively. Thus, during the programming mode (PROG=VCC, PROGB=VSS) if DATAINB=low CMOS level, then node G is pulled low; this turns N-channel MOSFET 58 off and P-channel MOSFET 60 on. This allows node D to pull up to VPPI and turn P-channel MOSFET 62 off.

For the other case, when the DATAINB=high CMOS level during the programming mode, node G pulls up towards the CMOS high level, thereby turning N-channel MOSFET 58 on and P-channel MOSFET 60 off. Node D is pulled down to VSS, thereby turning P-channel MOSFET 62 on which pulls node G towards VPPI, keeping P-channel MOSFET 60 off. Thus, circuit 24 works like a high voltage inverter.

Figure 6:
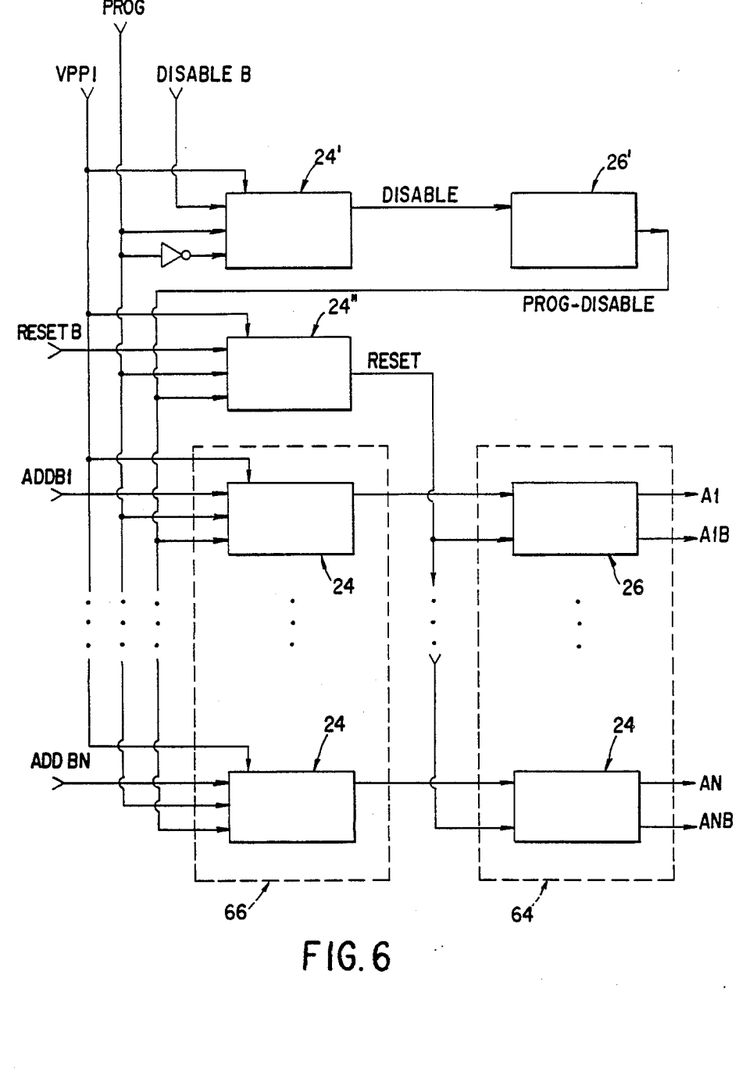
FIG. 6 is a block diagram illustrating use of the latch 26 shown in FIG. 4 in accordance with the present invention.

A similar circuit block 24 can be connected to the control gate of memory element 44 shown in FIG. 4. This implementation is shown in FIG. 6. This circuit can be used to reset the DATAOUT (Node B) of the nonvolatile latch to a low (VSS) state, by taking the RESETB signal low during the program cycle.

FIG. 6 shows one possible setup in which the nonvolatile latch circuit 26 could be used in accordance with the present invention.

Circuit block 64 includes an "N" bit long register which has the nonvolatile latch circuit 26 described above as the basic building block. The circuit block 66 includes "N" high voltage inverter circuits 24 described above, the outputs of each feeding into the input of a corresponding nonvolatile latch 26 in the block 64.

In addition to the "N" nonvolatile latch elements in the circuit block 64 and the "N" high voltage inverters in the circuit block 66, there are one additional nonvolatile latch element and two additional high voltage inverters shown in FIG. 6. All the high voltage inverters have VPPI and PROG as common inputs. The top circuit block 24' has the inverse of "PROG and DISABLE B" as the other inputs and its output "DISABLE" feeds into the control gate of one of the memory elements of the additional circuit block 26'. The control gate of the other memory element in the circuit block 26' is connected to VSS. The output "PROGDISABLE" of the circuit block 26' serves as a common input to the remaining N+1 high voltage inverters 24. The second high voltage inverter 24" outside of the circuit block 66 has its last remaining input connected to a signal called "RESETB" and its output "RESET" is connected to one input of each nonvolatile element in the circuit block 64. The last input of each high voltage inverter element in the circuit block 66 is connected to the input of the corresponding nonvolatile latch 26 in the circuit block 64 as shown in FIG. 6.

The transistor ratios of the cross-coupled inverters in the circuit block 24 outside of the circuit block 64 can be set such that the circuit powers up with PROG-DISABLE = VSS before the first PROG-DISABLE operation is performed. This enables the RESET operation to be performed on all the nonvolatile elements in the circuit block 64. The RESET operation resets all bits A0-AN to 0s'. Next the desired bit pattern ADDB1—ADDBN can be input to the circuit block 66 along with the other inputs VPPI (12-17V), PROG=VCC, DISABLE=VSS valid during the program cycle. After the programming cycle (typically 5-10 ms) the bit pattern A0-A7 should be identical to the desired bit pattern ADD1—ADDN that was input to the circuit block 66.

Once the desired bit pattern is programmed in, the circuit block 64 can be disabled from further pattern changes by performing a PROG-DISABLE operation. This is done by taking the PROG-DISABLE input to VSS during the programming operation with RESETB and ADDB1—ADDBN all at VCC. This operation makes the signal PROG-DISABLE permanently high, thereby disabling all future pattern changes in the circuit block 64.

A particular embodiment of the present invention is described below: (a) device 10 in an 8-pin dual-in-line and small-outline package. A PE (Program Enable) pin provides extra security against accidental programming. The PE pin must be held "high" while loading any programming instruction. However, after loading the instruction, the PE pin becomes a "don't care". A PRE (Protect Register Enable) pin is provided for all Protect-Register operations. Table 1 below lists the instructions for the device 10.

TABLE 1

Instruction Set

| Instruction | SB | Op Code | Address | Data | PRE | PE | Comments |
|---|---|---|---|---|---|---|---|
| READ | 1 | 10 | A7–A0 | | 0 | X | Reads data stored in memory, starting at specified address. |
| WEN | 1 | 00 | 11XXXXXX | | 0 | 1 | Write enable must precede all programming modes. |
| WRITE | 1 | 01 | A7–A0 | D15-D0 | 0 | 1 | Writes register if address is unprotected. |
| WRALL | 1 | 00 | 01XXXXXX | D15-D0 | 0 | 1 | Writes all registers Valid only when "protect register" is cleared. |
| WDS | 1 | 00 | 00XXXXXX | | 0 | X | Disables all programming instructions. |
| PRREAD | 1 | 10 | XXXXXXXX | | 1 | X | Reads address stored in "protect register". |
| PREN | 1 | 00 | 11XXXXXX | | 1 | 1 | Must immediately precede PRCLEAR, PRWRITE, and PRDS instructions. |
| PRCLEAR | 1 | 11 | 11111111 | | 1 | 1 | Clears the "protect register" so that no registers are protected from WRITE. |
| PRWRITE | 1 | 01 | A7–A0 | | 1 | 1 | Programs address into "protect register". Thereafter, memory addresses >= the address in "protect register" are protected from WRITE. |
| PRDS | 1 | 00 | 00000000 | | 1 | 1 | One time only instr. after which the address in the "protect register" cannot be altered. |

When VCC is first applied to the EEPROM device 10, it powers-up in the Write Disabled state, i.e. all programming modes must be preceded by a WRITE ENABLE (WEN) instruction. Once a WRITE ENABLE instruction is executed, programming remains enabled until a WRITE DISABLE (WDS) instruction is executed or VCC is removed from the device 10. This software solution to data security, in addition to the hardware (PE pin) solution, provides virtually foolproof protection against an inadvertent Write Cycle. In order to Write or alter the address stored in the protect register 14, a precise sequence of instructions must be followed. Otherwise the instruction will be ignored. The proper sequence is as follows: first the device 10 must be Write Enabled, second the Protect Register Enable (PREN) instruction is executed. The PREN instruction must be followed immediately by a Protect Register Clear (PRCLEAR), Protect Register Write (PRWRITE), or a Protect Register Disable (PRDS) instruction. The protect register operations must follow this sequence exactly and are specifically intended to provide data security to the protect register 14. The PRCLEAR instruction clears the address stored in the protect register 14 and removes the Write protection from all registers in the array 12. The PRWRITE instruction is used to write into the protect register 14 the address of the first register in the array 12 to be protected. Thus, a user-defined field of addresses can be protected from Write operations. The PRDS instruction is a one-time-only instruction that renders the protect register 14 unalterable, allowing the specified registers to become permanently protected against data changes.

It should be understood that various alternatives to the embodiment of the invention disclosed herein may be employed in practicing the invention. It is intended that the following claims define the invention and that circuits within the scope of these claims and their equivalents be covered thereby.

We claim:

1. An electrically erasable programmable read only memory (EEPROM) device that includes a memory array comprising a plurality of electrically erasable programmable read only memory data storage registers for storing data, each data storage register having a corresponding access address associated therewith, the access addresses defining the data storage registers sequentially from an initial data storage register to a final data storage, the EEPROM device further including means responsive to a read access address for reading data stored in a data storage register corresponding to the read access address, means responsive to an erase access address for electrically erasing data stored in a data storage registers corresponding to the erase access address, and means responsive to a write access address for altering data stored in a data storage register corresponding to the write access address, the EEPROM device further comprising:
   (a) a programmable memory protect register that stores the access address of a selected data storage register as a protect address, the protect address defining a sequence of data storage registers having addresses equal to or greater than the address of the selected data storage resister;
   (b) means responsive to the protect address for prohibiting alteration of data stored in the sequence of data storage registers defined by the protect address; and
   (c) means for permanently locking the protect address into the memory protect register thereby permanently converting each of the data storage registers in the sequence of data storage registers in the sequence of data storage registers defined by the protect address from an electrically erasable programmable read only memory data storage register to a read only data storage register.

2. An electrically erasable programmable read only memory (EEPROM) device that includes a memory array comprising a plurality of electrically erasable programmable read only memory data storage registers for storing data, each data storage register having a corresponding access address associated therewith, the access addresses defining the data storage registers sequentially from an initial data storage register to a final data storage register, the EEPROM device further including means responsive to a read access address for reading data stored in a data storage register corresponding to the read access address, means responsive to an erase access address for electrically erasing data stored in a data storage register corresponding to the erase access address, and means responsive to a write access address for altering data stored in a data storage register corresponding to the write access address, the EEPROM device further comprising:
   (a) an instruction register that receives a binary instruction that specifies an access address as a selected write access address;
   (b) a data shift register that receives data to be written into a data storage register corresponding to the selected write access address;
   (c) write means responsive to receipt of data by the data shift register for transferring data from the data shift register to the data storage register having an access address corresponding to the write access if write access to the data storage register has been enabled;
   (d) a programmable memory protect register that stores the access address of a selected data storage register as a protect address, the protect address defining a sequence of data storage registers having addresses equal to or greater than the address of the selected data storage register;
   (e) address decoder means responsive to receipt of a write enable signal and of the selected write access address for enabling write access to a data storage register having an access address corresponding to the selected write access address;
   (f) compare/enable means for comparing the selected write access address and the protect address and for providing the write enable signal to the address decoder means only if the data storage register corresponding to the selected write access address is not within the sequence of data storage registers defined by the protect address; and
   (g) means for permanently locking the protect address into the memory protect register thereby permanently converting each of the data storage registers in the sequence of data storage registers defined by the protect address from an electrically erasable programmable read only memory data storage register to a read only data storage register.

* * * * *

UNITED STATES PATENT AND TRADEMARK OFFICE
CERTIFICATE OF CORRECTION

PATENT NO. : 4,975,878

DATED : December 4, 1990

INVENTOR(S): Boddu et al.

It is certified that error appears in the above - identified patent and that said Letters Patent is hereby corrected as shown below:

Col. 11, line 42 "registers" should be --register--.

Col. 11, line 60 delete "in the sequence of data storage registers".

Signed and Sealed this

Twelfth Day of May, 1992

Attest:

DOUGLAS B. COMER

Attesting Officer    Acting Commissioner of Patents and Trademarks